US012346577B2

United States Patent
Knaappila et al.

(10) Patent No.: US 12,346,577 B2
(45) Date of Patent: Jul. 1, 2025

(54) MEMORY ALLOCATION BASED ON LIFESPAN

(71) Applicant: Silicon Laboratories Inc., Austin, TX (US)

(72) Inventors: Jani Knaappila, Evitskog (FI); Marius Grannaes, Hosle (NO)

(73) Assignee: Silicon Laboratories Inc., Austin, TX (US)

( * ) Notice: Subject to any disclaimer, the term of this patent is extended or adjusted under 35 U.S.C. 154(b) by 58 days.

(21) Appl. No.: 17/957,406

(22) Filed: Sep. 30, 2022

(65) Prior Publication Data

US 2024/0111437 A1   Apr. 4, 2024

(51) Int. Cl.
*G06F 3/06* (2006.01)

(52) U.S. Cl.
CPC .......... *G06F 3/0625* (2013.01); *G06F 3/0616* (2013.01); *G06F 3/064* (2013.01); *G06F 3/0679* (2013.01)

(58) Field of Classification Search
CPC ...... G06F 3/0625; G06F 3/0616; G06F 3/064; G06F 3/0679; G06F 1/3287; G06F 1/3275
See application file for complete search history.

(56) References Cited

U.S. PATENT DOCUMENTS

| | | | | |
|---|---|---|---|---|
| 10,157,008 B2 * | 12/2018 | Chun | ...... | G06F 3/068 |
| 10,417,121 B1 * | 9/2019 | Suhas | ...... | G06F 12/02 |
| 2010/0205374 A1 * | 8/2010 | Meka | ...... | G06F 12/023 |
| | | | | 711/171 |
| 2011/0185208 A1 * | 7/2011 | Iwamoto | ...... | G11C 5/141 |
| | | | | 713/323 |
| 2017/0017411 A1 * | 1/2017 | Choi | ...... | G06F 12/0246 |
| 2017/0206031 A1 * | 7/2017 | Yin | ...... | G06F 1/3225 |

FOREIGN PATENT DOCUMENTS

GB   2590389 A * 6/2021 ........... G06F 1/3225

OTHER PUBLICATIONS

Barrett, D., and Zorn, B., "Using Lifetime Predictors to Improve Memory Allocation Performance," ACM Digital Library, vol. 28, Issue 6, Jun. 1, 1993, pp. 187-196.

Knuth, D., "The Art of Computer Programming—Fundamental Algorithms," Section 2.5, Dynamic Storage Allocation, vol. 1, Third Edition, 1997, pp. 435-456.

* cited by examiner

*Primary Examiner* — Zhuo H Li
(74) *Attorney, Agent, or Firm* — Zagorin Cave LLP (57) ABSTRACT

Memory is allocated according to lifespan. The memory manager allocates requests for short-term memory to one portion of memory and allocates requests for long-term memory to another portion of the memory. The memory manager looks for free space for requests for long-term memory starting at a first location in the memory and the memory manager looks for free space beginning at a second location in the memory for requests for short-term memory. In that way, more memory banks are likely to be free and can be powered down to save power consumption, particularly during sleep states.

18 Claims, 7 Drawing Sheets

| Full RAM Kb | µA | Bank 0 Kb | µA | Savings |
|---|---|---|---|---|
| 512 | 4.0 | 16 | 2.5 | ~38% |
| 256 | 3.2 | 16 | 2.1 | ~35% |
| 64 | 2.2 | 16 | 1.9 | ~14% |
| 96 | 5.0 | 16 | 4.5 | ~10% |
| 32 | 1.44 | 24 | 1.35 | ~6% |

| Bits | Names | Description |
|---|---|---|
| 16 | Length of this block | The length of this block, also tells the position of the next block. |
| 16 | Length to previous block | The length of the previous block, also tells the position of the previous block. |
| 32 | MPU Process Mask | Each bit in a process mask tells if this data is accessible from that process |
| 1 | Block in use | Flags for the block (in use, etc.) |
| 2 | GC Tag | Garbage collector (GC) instance is used for this block. |
| 1 | GC Mark | Used during garbage collection to mark blocks that are in use |
| 12 | Reserved | |

MEMORY ALLOCATION BASED ON LIFESPAN

BACKGROUND

Field of the Invention

This disclosure relates to memory management and more particularly to memory allocations based on expected lifespan.

Description of the Related Art

In integrated circuits, static random access memory (SRAM) consumes power even when not being used due to leakage current. As memory size increases the amount of SRAM leakage current also increases. Reducing leakage current from SRAM can save power. Saving power is particularly useful for Internet of Things (IOT) integrated circuits that have power supplied by battery. One way to save power and reduce leakage current is to shut off certain parts of memory when entering a sleep state. Having the capability to shut off more memory can increase power savings.

Figure 1:
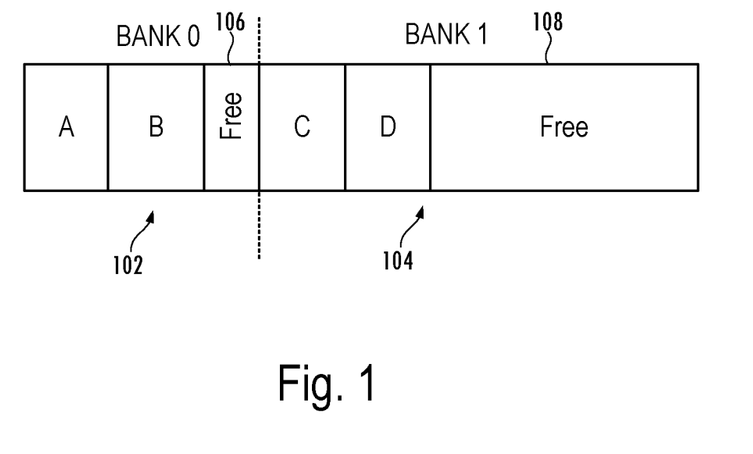
FIG. 1 illustrates one approach to RAM utilization.

FIG. 1 illustrates one approach to RAM utilization. The memory 101 includes two portions shown as bank 0 102 and bank 1 104. Bank 0 is reserved for software supplied by the manufacturer and bank 1 is for customer software. Bank 0 includes portions A and B allocated to different software and free space 106. Bank 1 includes portions C and D of the memory bank allocated to customer software and free memory space 108. In the approach shown in FIG. 1 RAM retention software is implemented by customer software in Bank 1. In practice, that means reserving banks in the linker file for the customer-specific use case and then implementing the application in such a way that it handles memory in these banks. When going to sleep customer software in bank 1 has to be certain that bank 1 does not contain any data that needs to be retained over a sleep cycle. The approach of FIG. 1 is difficult to use efficiently. Additionally, not all manufacturer software for specific customer needs necessarily fit into bank 0. Accordingly, more efficient allocation of software would be desirable.

SUMMARY OF EMBODIMENTS OF THE INVENTION

Accordingly, in one embodiment a method includes allocating first memory responsive to a first type of memory request for first data having a first expected lifespan. The first memory is allocated in a first portion of the memory that is associated with the first expected lifespan. The method further includes allocating second memory for a second type of memory request for second data having a second expected lifespan. The second memory is allocated in a second portion of the memory associated with the second expected lifespan. The first expected lifespan is longer than the second expected lifespan.

In another embodiment an apparatus includes a memory having a first memory portion allocated to a first type of memory request for data having a first expected lifespan and the memory includes a second memory portion allocated to a second type of memory request for data having a second expected lifespan. A memory manager responds to the first type of memory request by allocating memory in the first portion of memory and the memory manager responds to the second type of memory request by allocating memory in the second portion of the memory. The first expected lifespan is longer than the second expected lifespan.

In still another embodiment an integrated circuit includes a memory having a first portion allocated to a first type of memory request for data having a first expected lifespan and the memory includes a second portion allocated to a second type of memory request for data having a second expected lifespan. The second expected lifespan is shorter than the first expected lifespan. A processor is coupled to the memory and a memory manager is operable in the processor and responsive to the first type of memory request to allocate memory by looking for free space starting at a first location in the memory and the memory manager is responsive to the second type of memory request to allocate memory by looking for free space beginning at a second location in the memory.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

In embodiments herein, memory allocations are categorized by their expected lifespans. These categories overlay physical memory banks. The separation of allocations based on expected lifespans reduces memory fragmentation and increases the number of memory banks that can be shut down during sleep states, thus saving power.

Figure 2:
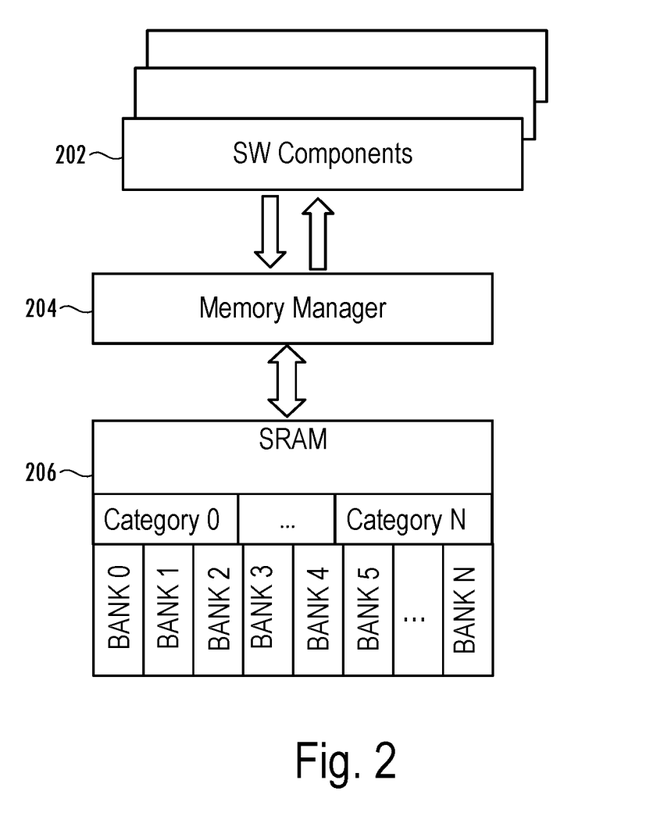
FIG. 2 illustrates a high-level block diagram of an embodiment of a system that includes software components, the memory manager, and memory.

FIG. 2 illustrates a high level diagram of an embodiment of a system that allocates memory based on expected lifespans. The system includes software components 202, the memory manager 204, and the SRAM 206. The memory 206 is divided into the various banks as shown. The memory manager 204 allocates the memory banks based on one or more categories as explained further herein. Thus, as shown in FIG. 2 category 0 software is allocated to banks 0, 1, and 2 and category N software is allocated to banks 4, 5, . . . , and N. The software components 202 provide the categories as part of the memory requests provided to the memory manager 204. Each software program of software components 202 typically has multiple memory allocations, each with its own lifetime. For example, a Bluetooth® stack might allocate ten to hundreds of long-term allocations and tens of short-term allocations.

Figure 3:
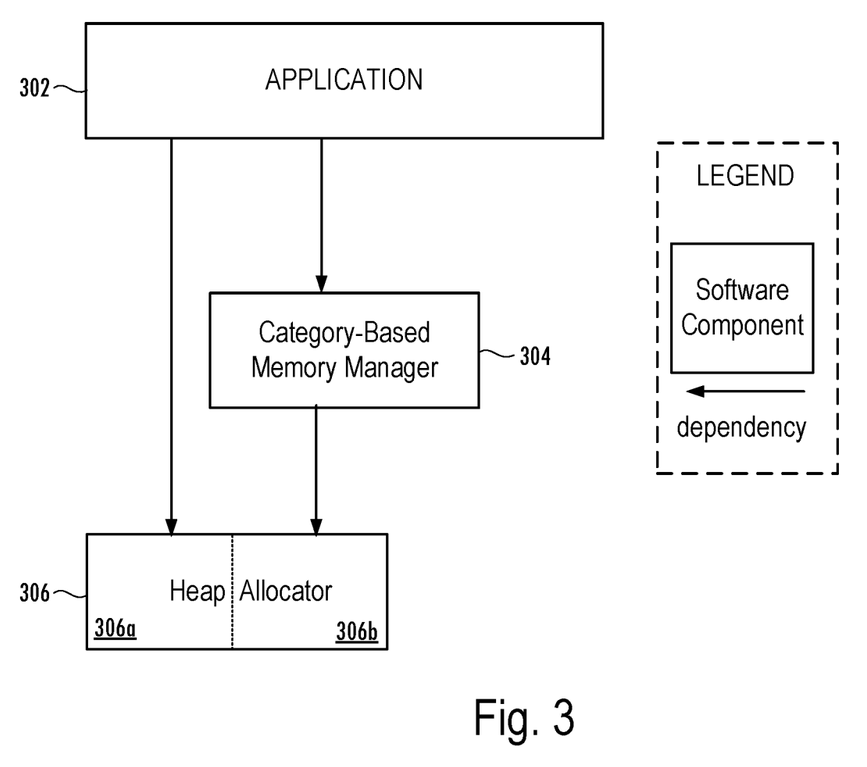
FIG. 3 illustrates a software system having three basic parts.

FIG. 3 illustrates an embodiment of a software system that has three basic parts. The software system includes the software component(s) 302, e.g., the various applications that use the category-based memory management component 304 or the Heap Allocator 306 to access the SRAM shown in FIG. 2. While shown as being separate high level blocks, the memory management components 304 and 306 may be part of one memory management component, where the category-based memory manager 304 uses the capabilities of the heap allocator 306. The software component(s) 302 request N bytes of continuous memory from the category-based memory management component 304 or the Heap Allocator 306. The heap allocator provides a simple malloc-like application programming interface (API) for applications. In embodiments, the Heap Allocator allows legacy programs to request memory without having to specify a category for the memory such as long-term and short-term. In contrast the category-based memory manager 304 allocates memory based on one or more categories associated with the memory request. One category is the expected lifespan of the data stored in the memory allocated to the memory request. The memory request to the category-based memory manager 304 from the software components include the necessary parameters for the category-based allocation. In embodiments these parameters include allocation size, estimated lifespan of the allocation, and the requester of the allocation. The requester of the allocation information can be used to ensure that certain portions of the memory are allocated only to those applications authorized to use that portion of memory for security purposes. The parameters can further include the purpose of the allocation. Of course, other embodiments may include additional or fewer parameters. Of particular interest to this disclosure is the estimated lifespan category. Embodiments described herein use that category to more efficiently allocate memory and therefore provide greater power savings in the sleep state by shutting down more SRAM. Note that the various categories may overlap, can span multiple memory banks, and the individual allocation algorithm for each category may vary. Since allocations are grouped into separate categories, it is more likely that several banks can be turned off to save power if no allocation is using them.

Figure 4:
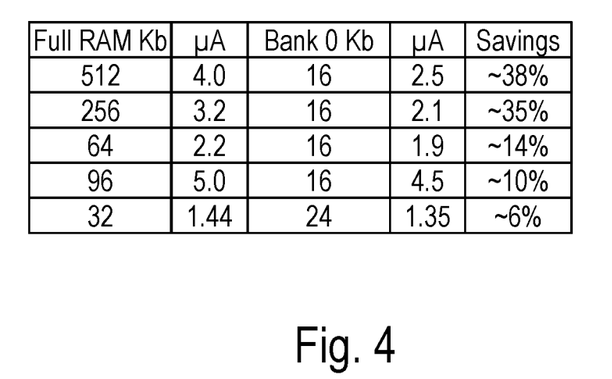
FIG. 4 illustrates potential power savings when memory banks are powered down for devices with different memory configurations as compared to full memory retention.

As stated earlier, as memory size grows on devices, so does the sleep current. To mitigate the growth in SRAM sleep current, devices have an option to shut off certain parts of memory when entering the sleep state. As shown in FIG. 1, memory is divided into separate banks. In embodiments, individual banks can be powered down separately when the device enters a sleep state. In that way, the device avoids power loss from leakage current for the banks that are powered down. The term "memory bank" in a lifespan allocation context refers to a block of memory that can be individually powered down. FIG. 4 shows memory configurations for different devices, current usage in μA for an integrated circuit with full memory retention for all banks, current usage when all but bank 0 are powered down, and the percentage saving when all banks except bank 0 are powered down, compared to full memory retention. Thus, for example a device with 512 kilobytes (KB) of RAM consumes 4.0 μA with the RAM fully powered. If only bank 0 remains powered (16 KB) and the rest of the RAM is powered down, the device consumes only 2.5 μA. Thus, powering down most of the RAM saves ~38% of the power. Similarly for a device with 256 KB of RAM, powering down all but bank 0 (16 KB) saves ~35% of power. As can be seen in FIG. 4, as the RAM in the device gets smaller, the amount of savings decreases. For the last entry, for a device with 32 KB total RAM and 24 KB remains powered (8 KB powered off) only a ~6% savings results. What is clear is that the opportunity to save power increases as a higher percentage of the RAM is powered down. Thus, being able to shut down more memory banks for a device sleep state saves power during the sleep state. Efficient allocation of memory before the sleep state helps save power. As can be seen from the table in FIG. 4, RAM plays a significant role in power consumption due to sleep current, which will get worse in the future as RAM sizes increases.

Figure 5:
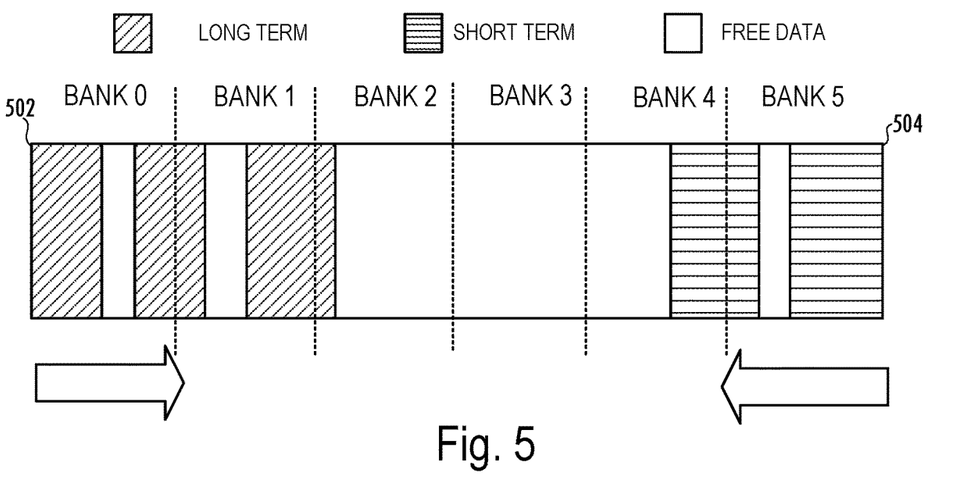
FIG. 5 illustrates an embodiment for separately allocating memory requests to long-term and short-term memory starting at each end of the memory.

Referring now to FIG. 5, the illustrated memory is composed of multiple memory banks, bank 0 to bank 5. The memory still shows up as a single continuous memory to the application software. To use as few memory banks as possible, memory allocations should cluster close together to reduce the number of banks being used. In that way, as a device prepares to enter a sleep state, as many memory banks as possible can be powered off to save power. In addition, embodiments herein use two categories for memory, long-term memory and short-term memory. Long-term memory is for memory allocations expected to have a long lifespan and short-term memory is for memory expected to have a short lifespan. In an embodiment long and short lifespans are based on whether an expectation exists that the data in the allocated memory will be needed after a next sleep state or whether the data will be consumed before the next sleep state. Data is being used herein as a general term for memory contents. In FIG. 5 each category clusters close to each end of the memory. In the embodiment of FIG. 5, the category-based memory manager allocates long-term memory starting from the beginning of bank 0 at 502 and going towards bank 5 and is for data that is long-lived and needs to be retained during a sleep state. Note that typically a system also includes static data that occupies some amount of RAM. Thus, e.g., allocations for long-term memory (or short-term memory) have to account for such allocations and may begin after the allocations for static data at one end of the memory. The memory controller allocates short-term memory starting from the end of the memory at 504 (end of bank 5) going towards bank 0 and is for short-lived data, e.g., for memory having content that does not need to be retained during a sleep state. Referring back to FIG. 3, in an embodiment the category-based memory manager 304 uses two memory allocators 306a and 306b. Memory allocator 306a allocates long-term memory and memory allocator 306b allocates short-term memory. The memory manager selects which allocator to use based on the whether the allocation is for long-term or short-term memory.

Figure 6:
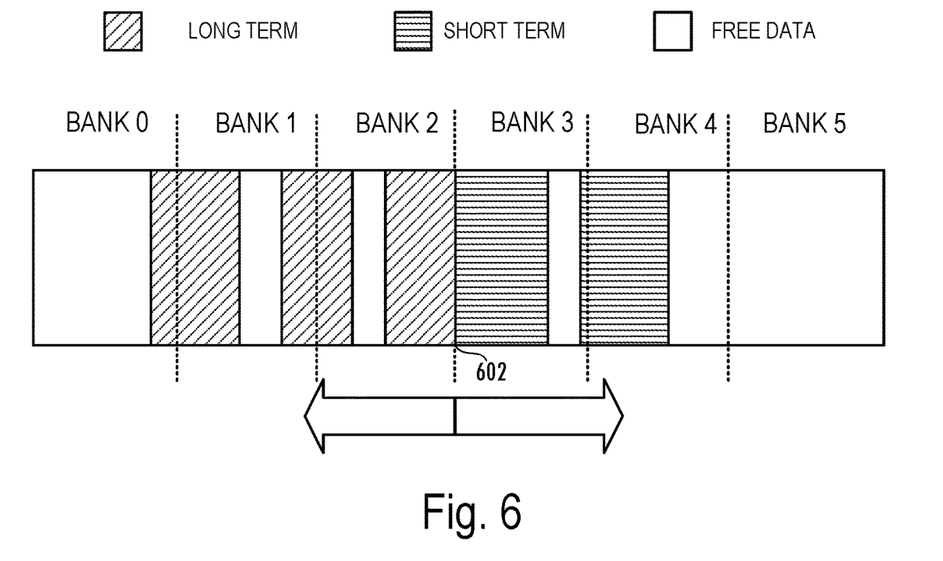
FIG. 6 illustrates another embodiment for separately allocating memory requests to long-term and short-term memory starting in the middle of the memory.

While FIG. 5 shows allocation from each end of memory (or each end after accounting for static allocations), in other embodiments the memory controller allocates long and short-term memory starting at different locations in the memory. Referring to FIG. 6 as an example, for use cases where the memory is expected to be allocated approximately equally to long and short-term uses, the category-based memory manager allocates long-term memory beginning in the middle of the memory, e.g., at the end of bank 2 in FIG. 6 towards bank 0. The category-based memory manager allocates short-term memory beginning at the start of bank 3 towards bank 5. The allocations should cluster together for efficiency. Of course the memory manager may allocate memory starting at locations in memory other than those shown in FIGS. 5 and 6 according to the needs of the particular application.

To be able to classify memory for different categories, the application needs to tell the memory manager what kind of memory the application requires for a particular memory request. In an embodiment, the application supplies a memory request that includes a flag, LONG_TERM, that defines if the memory request is for long-term memory. For requests that do not include an asserted LONG_TERM flag, the memory is assumed to be short-term. Of course, other embodiments may include a LONG-TERM flag and/or a SHORT_TERM flag. In addition, while lifespan expectations may be divided into two categories, in other embodiments, the expected lifespan is more granular, e.g., with long-term, medium term, and short-term categories.

Various criteria can be used to determine if the memory request is for long-term memory or short-term memory. One criterion for long-term is that the contents of the memory are expected to be needed for the full duration of the application or otherwise last a long time. Short-term memory is used for memory that is expected to be freed relatively soon. For example, a message in the internal message queue is expected to be short-term memory. Generic data buffers are usually short-lived, the thinking being that if there is data in the buffers, it is expected to be processed before entering a sleep state. However, an application could still categorize certain buffers to be long-lived, one case, e.g., is advertisement data associated with Bluetooth. A useful criteria for determining whether a memory request should be for long-term memory or short-term memory is whether the data stored in the memory allocated to the request is expected to be needed after the next sleep state. If not, the memory request can be considered to be for short-term memory and if the data is needed after the sleep state, the request should be for long-term memory. The particular software application may have different or additional criteria for determining whether a memory request should be categorized as being one for short-term memory or long-term memory. In addition, in embodiments the classification of memory can also be changed when needed by the application.

Figure 7:
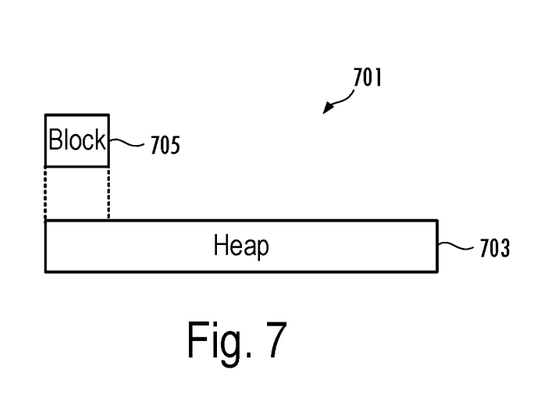
FIG. 7 illustrates a category-based memory manager with stacked logical data structures.

FIG. 7 shows another view of the memory manager that provides category-based memory management. The memory manager 701 has logical data structures built on top of each other. Each logical structure builds on top of the previous one, adding more features. In an embodiment heap 703 is a memory allocator that allocates memory depending on the requested category. A malloc-function can allocate any size of memory from this heap. In the embodiment illustrated in FIG. 7, the two allocators shown in FIG. 3 (306a and 306b) are combined into one software component—allocator 703. In an embodiment the memory manager passes a parameter indicating whether the allocation is for short-term or long-term memory. In an embodiment, the allocators are implemented as separate functions. The allocator functionality for long-term and short-term allocation shown in FIG. 7 shares the same memory and metadata but one allocator function allocates from "high to low" and another from "low to high" to implement allocation based on lifespan.

When a block of memory is not needed anymore, it is released back to the heap by a free-function. As this heap is global and shared with each task, its behavior is not deterministic, and any memory allocation can fail. Any user of the heap needs to ensure that allocation failures are handled properly. Another issue is the risk of external fragmentation. If the allocations are of different sizes and lifetimes, the heap may become fragmented and then there is no contiguous memory to be given to a request from the application.

Figure 8:
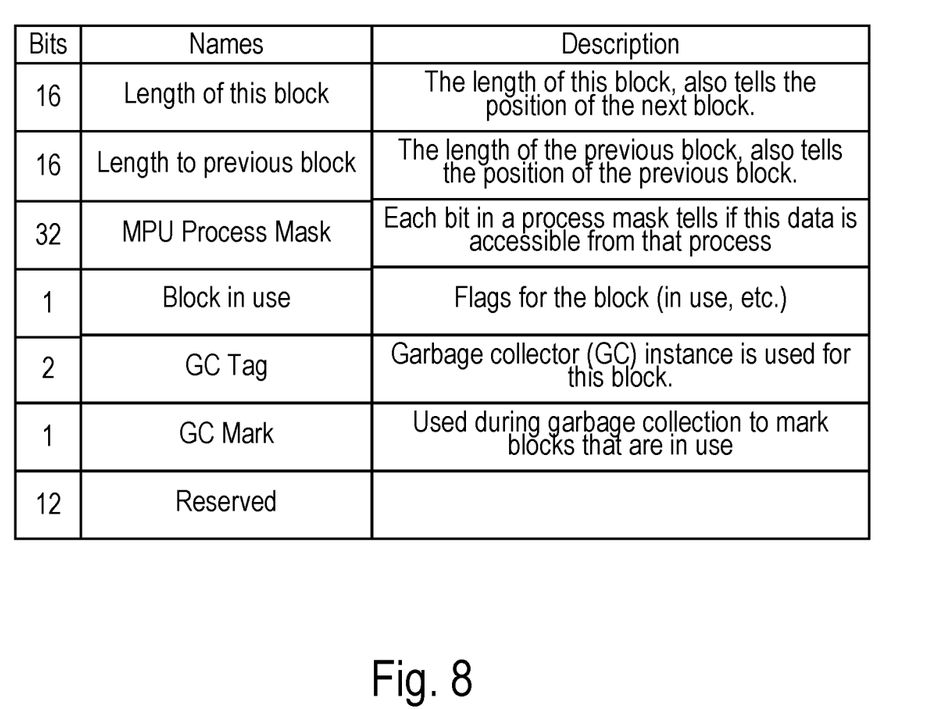
FIG. 8 illustrates an example of block metadata.

Blocks 705 are memory allocations managed by the memory manager. Blocks contain metadata about the allocation of a block, such as the size of a block, a link to the neighbor blocks, and the access permissions of the block. Block metadata is conventionally stored with the data. FIG. 8 illustrates an example of block metadata. The metadata includes the length of the block and the distance to the previous block metadata. The 32 bit process mask tells if the data is accessible from that process. The one bit block in use flag indicates whether the block is in use. The garbage collector (GC) tag indicates the garbage collection instance used. With a two bit field, three different instances can be selected with one value reserved for no garbage collection. The GC Mark one bit field indicates blocks in use during garbage collection.

Figure 9:
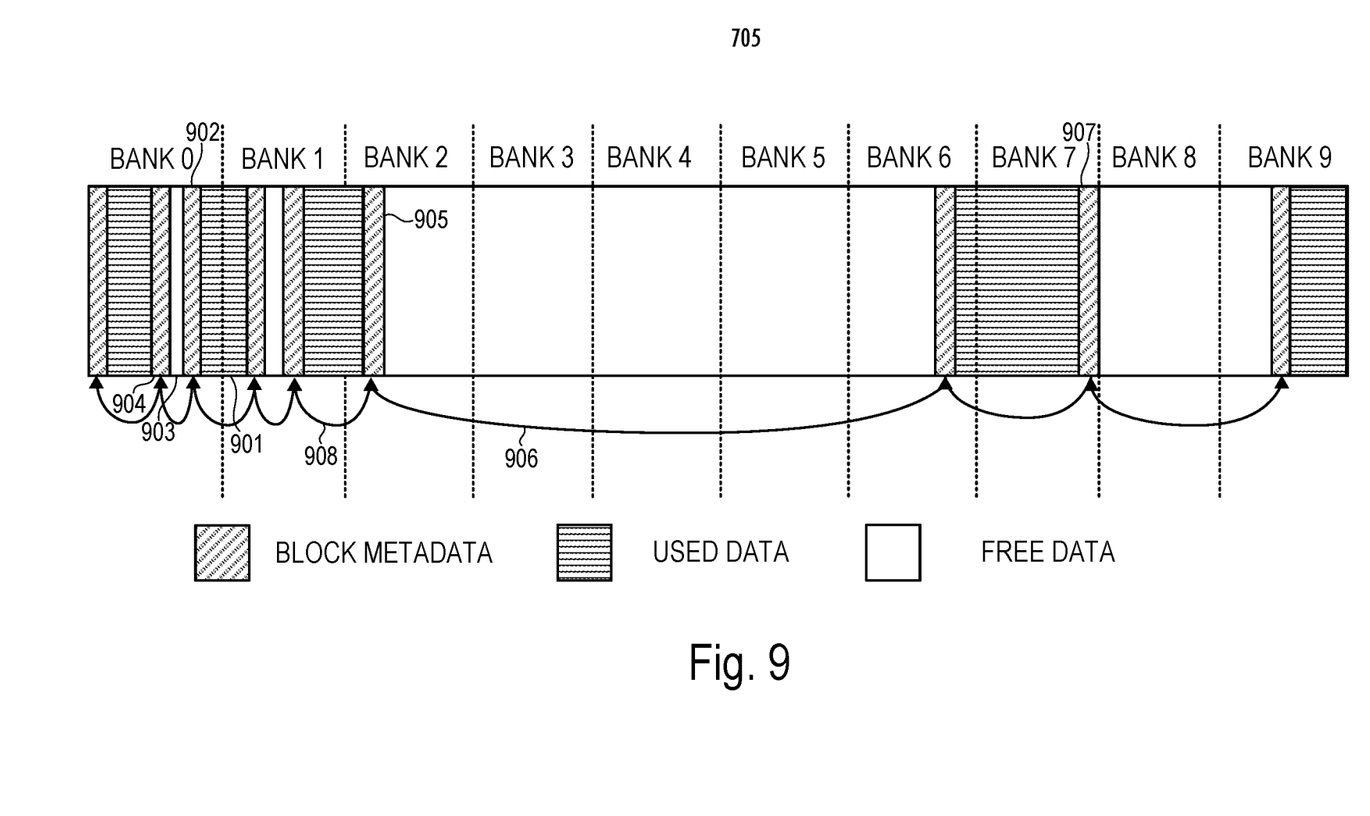
FIG. 9 illustrates memory blocks showing used data, free data, and block metadata.

FIG. 9 illustrates memory blocks and associated metadata and how pointers in the metadata point to the next metadata. As can be seen in FIG. 9, the metadata has pointers, e.g., pointer 906 to the next metadata location in bank 6 and pointer 908 to the previous metadata in bank 1. FIG. 9 also shows used data blocks and free data blocks in the memory banks. Note that there can be multiple data blocks allocated within a memory bank and thus a memory bank can have more than one metadata as shown, e.g., for banks 0 and 1. In addition, a memory block may span banks as shown for the data block 901, which spans banks 0 and 1 and has metadata 902. Even free blocks contain metadata and that metadata needs to be retained when powering down memory banks. Thus, for example, free block 903 has metadata 904. Free data blocks can be combined and represented by a single metadata to increase efficiency of memory allocation. For example, the metadata 905 in bank 2 represents the combined free memory blocks in banks 2, 3, 4, and 5. In another example, the metadata 907 in bank 7 also represents the free memory blocks in bank 8. During a device sleep state, memory banks 3, 4, 5, and 8 can be powered off, as the metadata for the free blocks in those banks is on a separate memory bank.

In an embodiment, the category-based memory manager allocates blocks of memory using the first-fit method as described by Knuth in chapter 2.5 of The "Art of Computer Programming: Volume 1: Fundamental Algorithms." The first-fit method has the advantage that it can be used to search from both ends of a double-linked list. Thus, with reference back to FIG. 5, the short-term and long-term categories of memory blocks are allocated from different ends of the linked list of blocks. FIG. 9 illustrates how the blocks of memory are linked by linking their metadata both forward and backward. Depending on the category, when allocating a block of memory, the memory manager starts to search for a free block meeting the request criteria from the beginning of the memory blocks or the end of the memory blocks. When the memory manager has found a suitable block and the block is larger than requested memory, the allocation will split the block and return either the lower side or higher side of it to the application, depending on whether the request was for short-term memory (returns high side) or long-term memory (returns low side). The memory manager creates new block metadata to represent new memory unless a free block was found that was exactly the right size. Of course, many other allocation approaches can be used according to, e.g., the number of categories considered in the allocation. Deallocation is a straightforward operation. Deallocation marks the used block as a free block and then combines the newly freed block with the next and previous free blocks.

Figure 10:
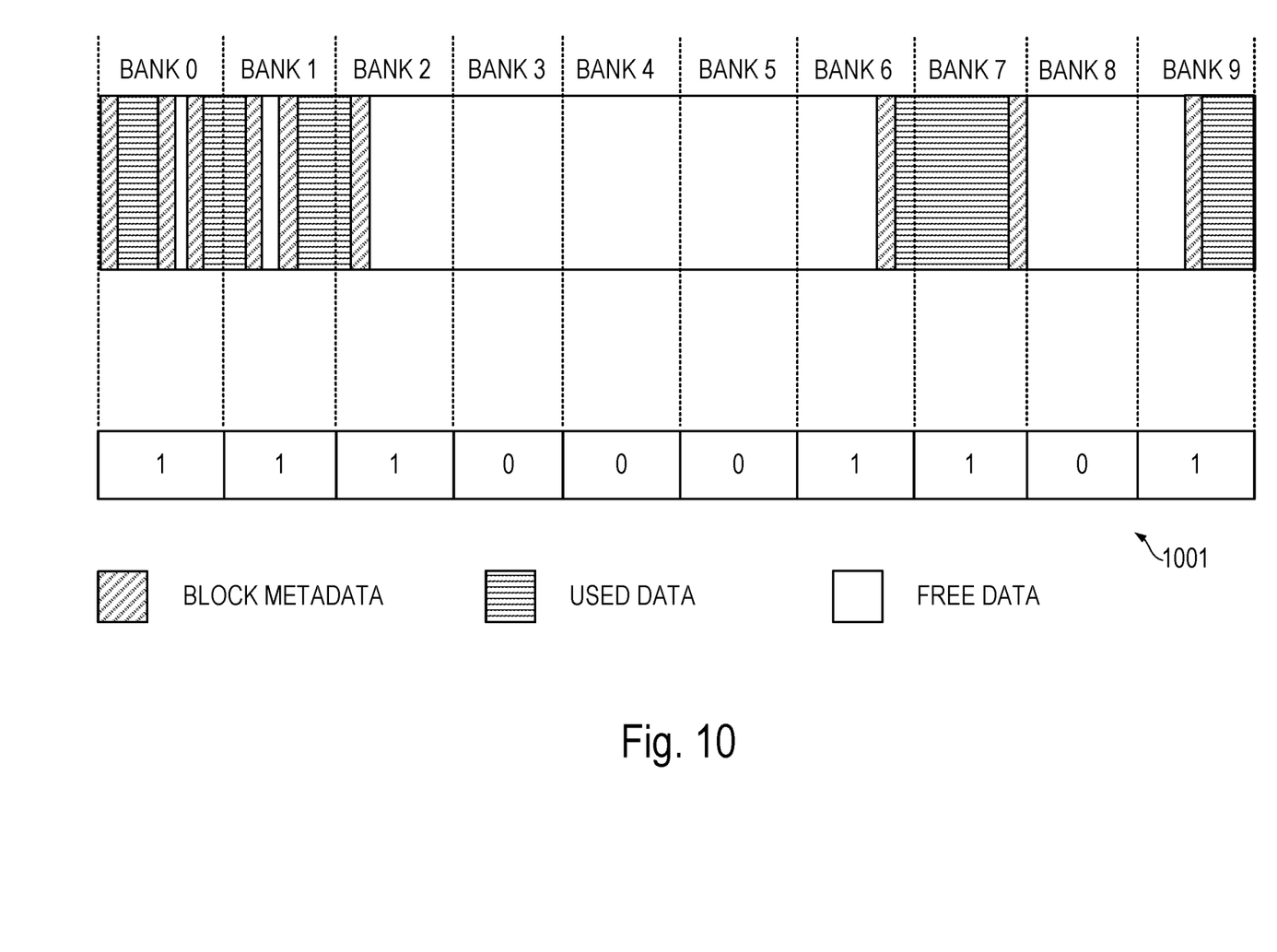
FIG. 10 illustrates a retention mask for use with retaining/powering down blocks when entering a sleep state.

Allocating memory blocks close to each other and properly classifying memory as long-term or short-term, allows memory banks to be powered off more efficiently. As part of entering a sleep state, the system requests that the category-based memory manager keep the necessary RAM banks powered on. FIG. 10 illustrates an embodiment of a retention mask 1001 used in determining if a memory bank can be powered off. The retention mask includes a bit for each bank and sets a bit for a particular memory bank a "1" to indicate the bank should be retained (kept powered) and sets the bit to "0" to indicate the bank should be powered off. Memory retention operations are performed during allocation and de-allocation operations. Allocation marks the memory bank to be retained when a block in that memory bank is allocated. Deallocation checks if a deallocated memory block can be combined into a newly formed free block that covers a full bank and if so, marks that bank to not be retained. The metadata for combined free blocks get updated during deallocation. If short-term memory is consumed prior to a sleep state, that short-term memory is more likely to be deallocated and result in a bank that can be marked as not to be retained.

The memory manager includes various functions for each aspect of the memory manager including heap, memory protection, and garbage collection and provides an application programing interface (API) for use by application programs to access the functions provided by the memory manager. In an embodiment a heap memory function operates directly with pointers in memory. An allocate function receives the size of memory requested and allocates the requested memory of appropriate size and returns a pointer to it. In an embodiment that is a simple allocation function and does not allocate memory by category but simply by size. That sort of allocation function can be used by legacy programs that do not differentiate between categories. Thus, for programs with an expectation to be able to use the standard malloc( ) and free( ) functions found in the C programming language, the memory manager behaves like a standard memory allocator. Allocation requests using malloc( ) are considered to be requests for long-term memory as it is not known if the allocation request is for long-term or short-term memory. The deallocate function deallocates the memory previously allocated by a call to the allocate function. A category-based memory allocation function allocates memory by size and category using one or more flags in the call to the function. The category based allocation function allocates a block of memory according to size and category and returns a block object. An error is returned if an allocation fails.

Figure 11:
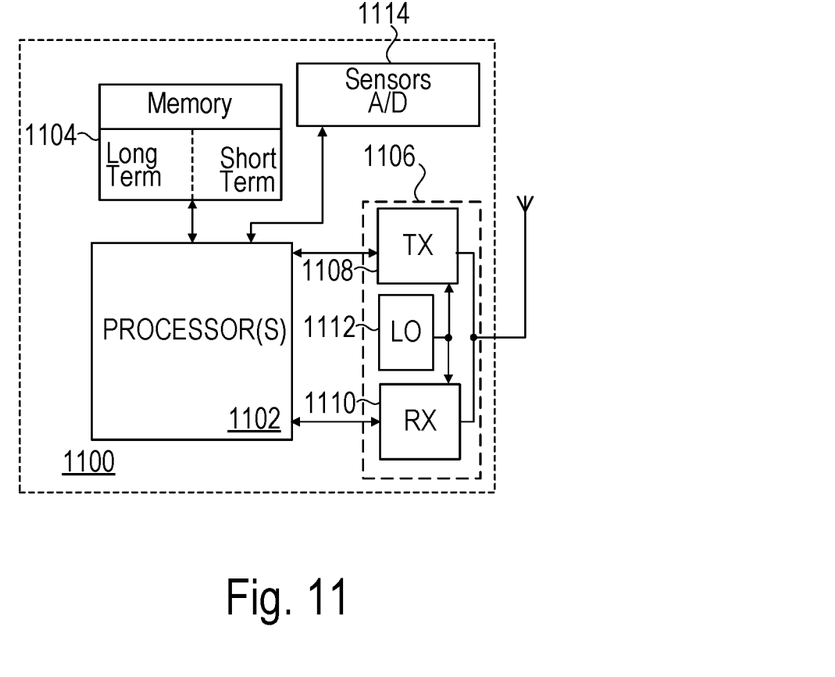
FIG. 11 illustrates an embodiment of an integrated circuit that separately allocates memory requests based on expected lifespan to more efficiently allocate memory to thereby increase power savings by reducing leakage current during sleep states.

FIG. 11 illustrates a high level block diagram of a system implemented on an integrated circuit 1100 that allocates long-term and short-term memory as described herein to achieve greater power savings during sleep states. The integrated circuit 1100 includes one or more processors 1102 and associated memory 1104. The memory 1104 includes memory for storing data allocated according to long-term and short-term memory expectations, memory for the software components that make the memory allocation requests, and memory for memory management software utilized for memory allocation, and other operating system software. The memory includes SRAM and may further include non-volatile memory (NVM) as well as dynamic RAM according to the particular application in which the integrated circuit operates. In an embodiment, the system includes a wireless block 1106 that includes analog logic to communicate using one or more wireless protocols such as Wi-Fi®, Bluetooth®, Zigbee™, or other short range or long range wireless protocols. The wireless block includes transmission circuits 1108, receive circuits 1110 and a local oscillator 1112. The integrated circuit includes sensors and analog to digital conversion (ADC) circuits 1114 to convert sensed data into digital information that can be used by the one or more processors 1102 or transmitted as needed. In an embodiment the integrated circuit 1100 performs applications used in Internet of Things (IoT) applications, e.g., home applications such as appliances, lighting control, remote sensing such as water meters, automotive applications, and retail applications. The integrated circuit 1100 is powered by a battery (not shown) and periodically wakes up to supply or receive information over the wireless block 1106. While in a sleep state, more efficient memory allocation based on expected lifespan in integrated circuit 1100 allows greater power savings in sleep states by shutting down more memory banks.

While memory allocation based on lifespan is advantageous by potentially saving power during sleep states, the teachings regarding memory allocation according to lifespan can be used in any application where allocation by lifespan proves useful. For example, in embodiments memory banks that are free are not powered up until needed even during wake states to save additional power. The powered down memory banks can be powered up as needed when a block of memory is requested.

Thus, embodiments allocate memory based on expectations of long-term and short-term need to more efficiently allocate memory and allow for more memory to be powered down to reduce leakage current and save power. The description of the invention set forth herein is illustrative and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method comprising:
allocating first memory locations responsive to a first type of memory request for first data having a first expected lifespan, the first memory locations being allocated in a first portion of memory associated with the first expected lifespan, the first expected lifespan being associated with data expected to be needed after a sleep state;
allocating second memory locations responsive to a second type of memory request for second data having a second expected lifespan, the second memory locations being allocated in a second portion of memory associated with the second expected lifespan, the second expected lifespan being associated with data expected to be consumed before the sleep state, and the first expected lifespan being longer than the second expected lifespan;
sending a memory request from a software component to a memory manager;
identifying the memory request as the first type of memory request or the second type of memory request using one or more lifespan flags in the memory request;
consuming the second data prior to the sleep state;

powering down a free memory bank containing the second memory locations during the sleep state; and
retaining the first data in the first memory locations during the sleep state.

2. The method as recited in claim 1 further comprising:
allocating the first type of memory request by looking for free space starting from a first location in the first portion of memory; and
allocating the second type of memory request by looking for free space starting from a second location in the second portion of memory.

3. The method as recited in claim 2 wherein the first location in memory is a beginning of the memory and the second location is an end of the memory.

4. The method as recited in claim 1 further comprising powering off the free memory bank during the sleep state according to a retention mask indicating that the free memory bank can be powered off during the sleep state.

5. The method as recited in claim 4 further comprising keeping at least a second memory bank powered during the sleep state according to the retention mask indicating the second memory bank needs to remain powered during the sleep state, the second memory bank containing the first data in the first memory locations.

6. A method comprising:
allocating first memory responsive to a first type of memory request for first data having a first expected lifespan, the first memory being allocated in a first portion of memory associated with the first expected lifespan;
allocating second memory for a second type of memory request for second data having a second expected lifespan, the second memory being allocated in a second portion of memory associated with the second expected lifespan, the first expected lifespan being longer than the second expected lifespan;
combining free blocks in memory into combined free blocks;
representing the combined free blocks in memory by a single metadata in a memory bank containing at least one of the free blocks; and
powering off during a sleep state one or more memory banks containing some of the combined free blocks and not containing the single metadata.

7. An apparatus comprising:
a memory including a first portion allocated to a first type of memory request for data having a first expected lifespan and the memory including a second portion allocated to a second type of memory request for data having a second expected lifespan;
a memory manager responsive to the first type of memory request to allocate first memory locations in the first portion of memory and the memory manager is responsive to the second type of memory request to allocate second memory locations in the second portion of the memory;
wherein the first expected lifespan is longer than the second expected lifespan;
wherein the first expected lifespan is associated with data expected to be needed after a sleep state;
wherein the second expected lifespan is associated with data expected to be used before the sleep state; and
wherein the second memory locations that contained data with the second expected lifespan are powered down during the sleep state.

8. The apparatus as recited in claim 7 wherein,
the memory manager allocates the first memory locations to the first type of memory request by looking for free space starting from a first location in the first portion of the memory; and
wherein the memory manager allocates the second memory locations to the second type of memory request by looking for free space starting from a second location in the second portion of the memory.

9. The apparatus as recited in claim 7 wherein a memory request includes a flag to identify whether the memory request is the first type of memory request or the second type of memory request.

10. The apparatus as recited in claim 7 wherein the memory manager combines a plurality of free memory blocks into combined free memory blocks and stores a single metadata in a memory bank to represent the combined free memory blocks.

11. The apparatus as recited in claim 10 wherein one or more memory banks containing at least some of the free memory blocks and not containing the single metadata are powered off during the sleep state.

12. The apparatus as recited in claim 7 further comprising a retention mask indicating which of a plurality of banks of the memory are to be powered off during the sleep state.

13. The apparatus as recited in claim 7 wherein the data having the second expected lifespan in the second memory locations is consumed before the sleep state and the second memory locations are deallocated prior to the sleep state and the second memory locations are in a free memory block after being deallocated.

14. An apparatus comprising:
a memory including a first portion for allocation to a first type of memory request for data having a first expected lifespan and the memory having a second portion for allocation to a second type of memory request for data having a second expected lifespan, the second expected lifespan being shorter than the first expected lifespan;
a processor coupled to the memory;
a memory manager responsive to the first type of memory request to allocate memory by looking for free space starting at a first location in the first portion of memory to allocate long-term memory and the memory manager is responsive to the second type of memory request to allocate memory by looking for free space beginning at a second location in the second portion of memory to allocate short-term memory;
wherein the first expected lifespan is associated with data expected to be needed after a sleep state;
wherein the second expected lifespan is associated with data expected to be used before the sleep state; and
wherein memory locations that contained the data with the second expected lifespan are powered down during the sleep state.

15. The apparatus as recited in claim 14 wherein the first type of memory request contains one or more flags indicating that the first type of memory request is for long-term memory and the second type of memory request contains one or more flags indicating that the second type of memory request is for short-term memory.

16. The apparatus as recited in claim 14 wherein the memory manager combines a plurality of free memory blocks into combined free memory blocks and stores a single metadata in a memory bank containing one or more of the free memory blocks to represent the combined free memory blocks.

17. The apparatus as recited in claim 16 wherein one or more memory banks containing at least some of the free memory blocks and not containing the single metadata are powered off during the sleep state.

18. The apparatus as recited in claim 14 wherein the memory locations are deallocated prior to the sleep state.

* * * * *